(12) United States Patent  (10) Patent No.: US 8,572,950 B2
Bisaiji et al.  (45) Date of Patent: Nov. 5, 2013

(54) EXHAUST PURIFICATION SYSTEM OF INTERNAL COMBUSTION ENGINE

(75) Inventors: Yuki Bisaiji, Mishima (JP); Kohei Yoshida, Gotemba (JP); Mikio Inoue, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/255,774

(22) PCT Filed: Mar. 15, 2010

(86) PCT No.: PCT/JP2010/054731
§ 371 (c)(1),
(2), (4) Date: Sep. 22, 2011

(87) PCT Pub. No.: WO2011/114500
PCT Pub. Date: Sep. 22, 2011

(65) Prior Publication Data
US 2013/0022512 A1  Jan. 24, 2013

(51) Int. Cl.
*F01N 3/00* (2006.01)
(52) U.S. Cl.
USPC ............ 60/286; 60/285; 60/297; 60/303
(58) Field of Classification Search
USPC ............ 60/274, 285, 286, 297, 301, 303
See application file for complete search history.

(56) References Cited

U.S. PATENT DOCUMENTS

| | | | |
|---|---|---|---|
| 6,813,882 B2 * | 11/2004 | Hepburn et al. | 60/286 |
| 7,063,642 B1 | 6/2006 | Hu et al. | |
| 7,073,325 B2 * | 7/2006 | Nakatani et al. | 60/295 |
| 7,165,393 B2 | 1/2007 | Betta et al. | |
| 7,412,823 B2 * | 8/2008 | Reuter et al. | 60/295 |
| 7,549,284 B2 * | 6/2009 | Iihoshi et al. | 60/285 |
| 8,099,950 B2 * | 1/2012 | Kojima et al. | 60/286 |
| 8,215,101 B2 | 7/2012 | Tsujimoto et al. | |
| 8,261,532 B2 * | 9/2012 | Fukuda et al. | 60/285 |
| 2003/0101713 A1 | 6/2003 | Dalla Betta et al. | |
| 2004/0050037 A1 | 3/2004 | Betta et al. | |
| 2005/0135977 A1 | 6/2005 | Park et al. | |
| 2006/0053778 A1 | 3/2006 | Asanuma et al. | |

(Continued)

FOREIGN PATENT DOCUMENTS

EP   1 033 479 A2   9/2000
EP   1 519 015 A2   3/2005

(Continued)

OTHER PUBLICATIONS

International Search Report dated Jun. 15, 2010 in International Application No. PCT/JP2010/054731 (with translation).

(Continued)

*Primary Examiner* — Binh Q Tran
(74) *Attorney, Agent, or Firm* — Oliff & Berridge, PLC

(57) ABSTRACT

In an internal combustion engine, inside of an engine exhaust passage in order from an upstream side, a hydrocarbon feed valve, oxidation catalyst, and exhaust purification catalyst are arranged. On the exhaust purification catalyst, platinum and rhodium are carried and a basic layer is formed. Hydrocarbons are intermittently fed from the hydrocarbon feed valve while maintaining the air-fuel ratio of the exhaust gas flowing into the exhaust purification catalyst lean. At this time, the feed of hydrocarbons is controlled so as to ensure the continued presence of the reducing intermediate on the basic layer.

13 Claims, 10 Drawing Sheets

(56) References Cited

U.S. PATENT DOCUMENTS

| | | |
|---|---|---|
| 2006/0286012 A1 | 12/2006 | Socha et al. |
| 2007/0059223 A1 | 3/2007 | Golunski et al. |
| 2008/0196398 A1 | 8/2008 | Yan |
| 2008/0276602 A1 | 11/2008 | McCabe et al. |
| 2009/0084091 A1 | 4/2009 | Tsujimoto et al. |
| 2009/0282809 A1 | 11/2009 | Toshioka |
| 2010/0242459 A1 | 9/2010 | Tsujimoto et al. |

FOREIGN PATENT DOCUMENTS

| | | |
|---|---|---|
| EP | 1 710 407 A1 | 10/2006 |
| EP | 1 793 099 A1 | 6/2007 |
| EP | 2 063 078 A1 | 5/2009 |
| JP | A-2000-257419 | 9/2000 |
| JP | A-2002-188429 | 7/2002 |
| JP | A-2005-177738 | 7/2005 |
| JP | A-2007-064167 | 3/2007 |
| JP | B2-3969450 | 9/2007 |
| JP | A-2008-69769 | 3/2008 |
| JP | A-2008-232003 | 10/2008 |
| JP | A-2008-543559 | 12/2008 |
| JP | A-2009-275666 | 11/2009 |
| WO | WO 2008/012653 A2 | 1/2008 |
| WO | WO 2009/082035 A1 | 7/2009 |

OTHER PUBLICATIONS

Jun. 20, 2012 Search Report issued in European Patent Application No. 10845966.0.

Jun. 15, 2010 International Search Report issued in PCT/JP2010/054740 (with translation).

Jun. 15, 2010 Written Opinion issued in PCT/JP2010/054740 (with translation).

Jun. 29, 2010 International Search Report issued in International Patent Application No. PCT/JP2010/056345.

Jan. 17, 2013 Office Action issued in U.S. Appl. No. 13/202,733.

Apr. 4, 2013 Office Action issued in U.S. Appl. No. 13/255,710.

U.S. Appl. No. 13/255,710 in the name of Bisaiji et al. filed Oct. 12, 2011.

U.S. Appl. No. 13/202,733 in the name of Bisaiji et al. filed Sep. 30, 2011.

U.S. Appl. No. 13/934,080, filed Jul. 2, 2013, in the name of Bisaiji et al.

* cited by examiner

Fig.6
(A)
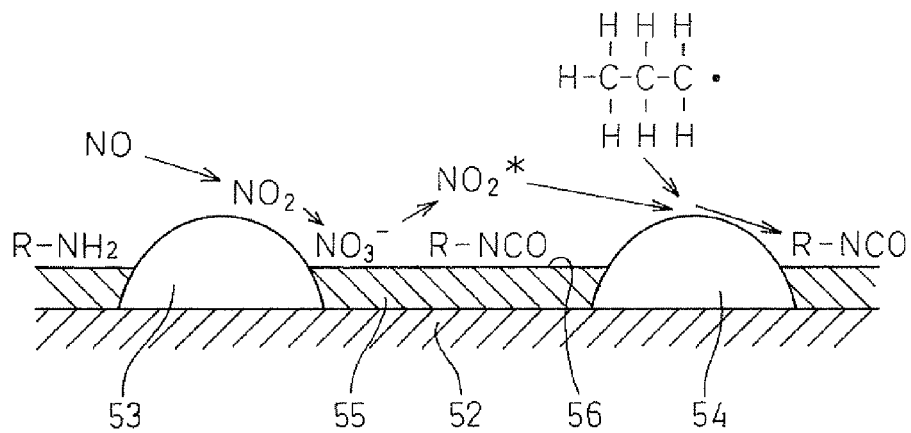
(B)
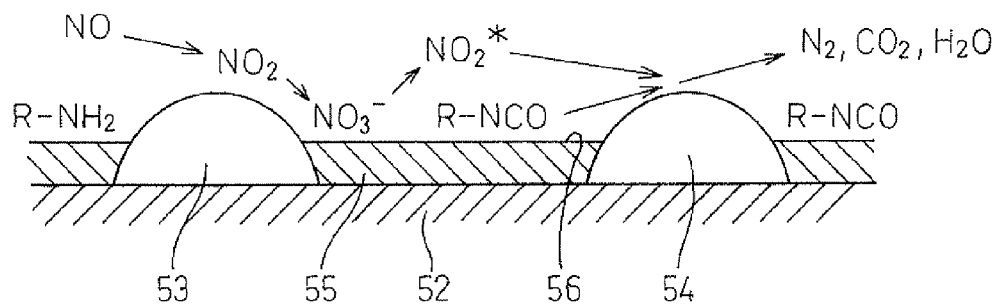

Fig.7
(A)
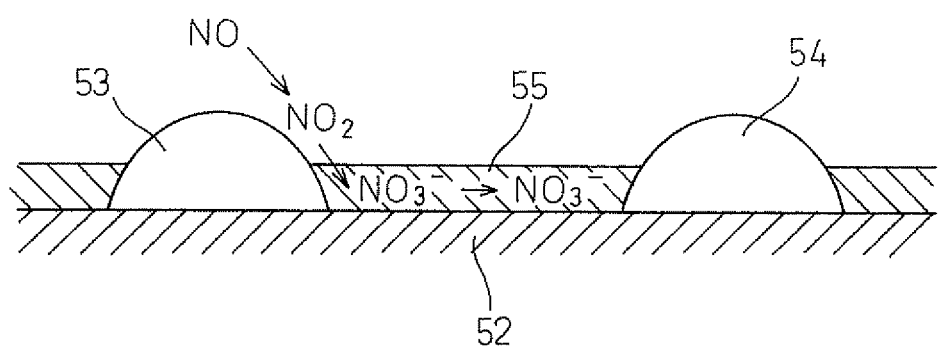
(B)
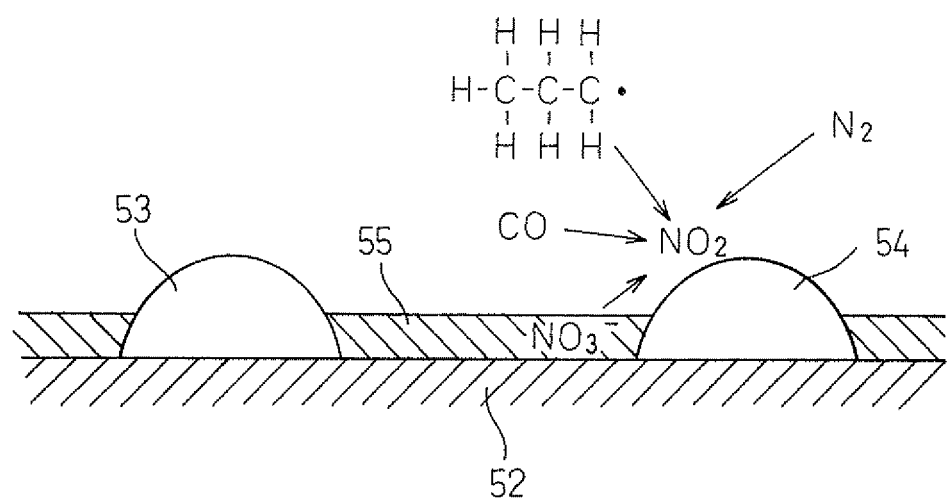

Fig.10
(A)
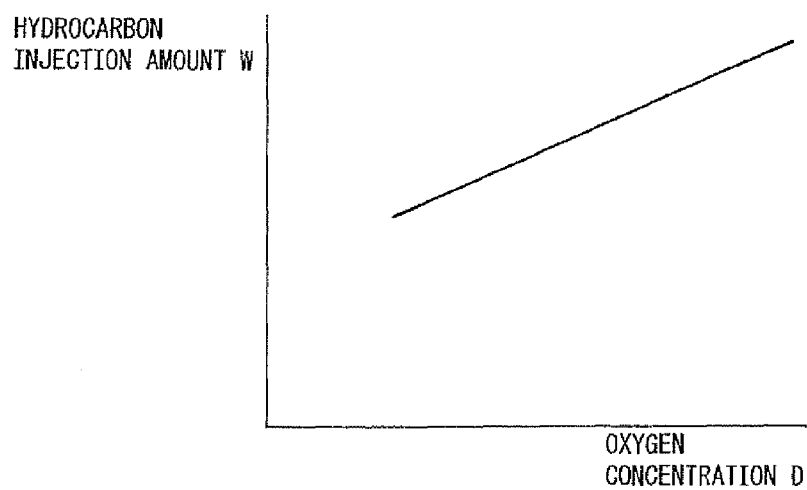
(B)
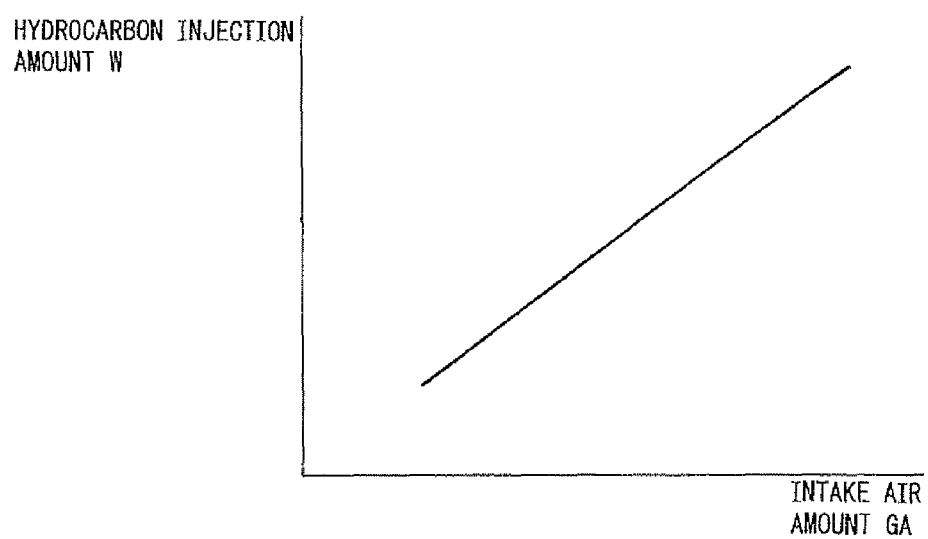

US 8,572,950 B2

EXHAUST PURIFICATION SYSTEM OF INTERNAL COMBUSTION ENGINE

TECHNICAL FIELD

The present invention relates to an exhaust purification system of an internal combustion engine.

BACKGROUND ART

Known in the art is an internal combustion engine which arranges, in an engine exhaust passage, an $NO_x$ storage catalyst which stores $NO_x$ which is contained in exhaust gas when the air-fuel ratio of the inflowing exhaust gas is lean and which releases the stored $NO_x$ when the air-fuel ratio of the inflowing exhaust gas becomes rich, which arranges, in the engine exhaust passage upstream of the $NO_x$ storage catalyst, an oxidation catalyst which has an adsorption function, and which feeds hydrocarbons into the engine exhaust passage upstream of the oxidation catalyst to make the air-fuel ratio of the exhaust gas flowing into the $NO_x$ storage catalyst rich when releasing $NO_x$ from the $NO_x$ storage catalyst (for example, see Patent Literature 1).

In this internal combustion engine, the hydrocarbons which are fed when releasing $NO_x$ from the $NO_x$ storage catalyst are made gaseous hydrocarbons at the oxidation catalyst, and the gaseous hydrocarbons are fed to the $NO_x$ storage catalyst. As a result, the $NO_x$ which is released from the $NO_x$ storage catalyst is reduced well.

CITATION LIST

Patent Literature

Patent Literature 1: Japanese Patent No. 3969450

SUMMARY OF INVENTION

Technical Problem

However, there is the problem that when the $NO_x$ storage catalyst becomes a high temperature, the $NO_x$ purification rate falls.

An object of the present invention is to provide an exhaust purification system of an internal combustion engine which can obtain a high $NO_x$ purification rate even if the temperature of the exhaust purification catalyst becomes a high temperature.

Solution to Problem

According to the present invention, there is provided an exhaust purification system of an internal combustion engine wherein a hydrocarbon feed valve for feeding hydrocarbons is arranged inside of an engine exhaust passage, an exhaust purification catalyst for reacting $NO_x$ contained in exhaust gas and hydrocarbons which are injected from the hydrocarbon feed valve and are partially oxidized is arranged in the engine exhaust passage downstream of the hydrocarbon feed valve, a precious metal catalyst is carried on the exhaust purification catalyst and a basic layer is formed on the exhaust purification catalyst, the exhaust purification catalyst has a property of reducing the $NO_x$ which is contained in the exhaust gas when hydrocarbons are injected from the hydrocarbon feed valve at predetermined feed intervals while maintaining an air-fuel ratio of an exhaust gas flowing into the exhaust purification catalyst lean and has a property of being increased in storage amount of $NO_x$ which is contained in the exhaust gas when the feed intervals of the hydrocarbons are longer than the predetermined feed intervals, and, at the time of engine operation, hydrocarbons are injected from the hydrocarbon feed valve at said predetermined feed intervals while maintaining the air-fuel ratio of the exhaust gas flowing into the exhaust purification catalyst, and thereby $NO_x$ which is contained in exhaust gas is reduced at the exhaust purification catalyst.

Advantageous Effects of Invention

Even if the temperature of the exhaust purification catalyst becomes a high temperature, a high $NO_x$ purification rate can be obtained.

BRIEF DESCRIPTION OF DRAWINGS

FIG. 6 is a view for explaining an oxidation reduction reaction in an exhaust purification catalyst.

FIG. 7 is a view for explaining an oxidation reduction reaction in an exhaust purification catalyst.

FIG. 10 is a view showing an amount of injection of hydrocarbons per unit time.

DESCRIPTION OF EMBODIMENTS

Figure 1:
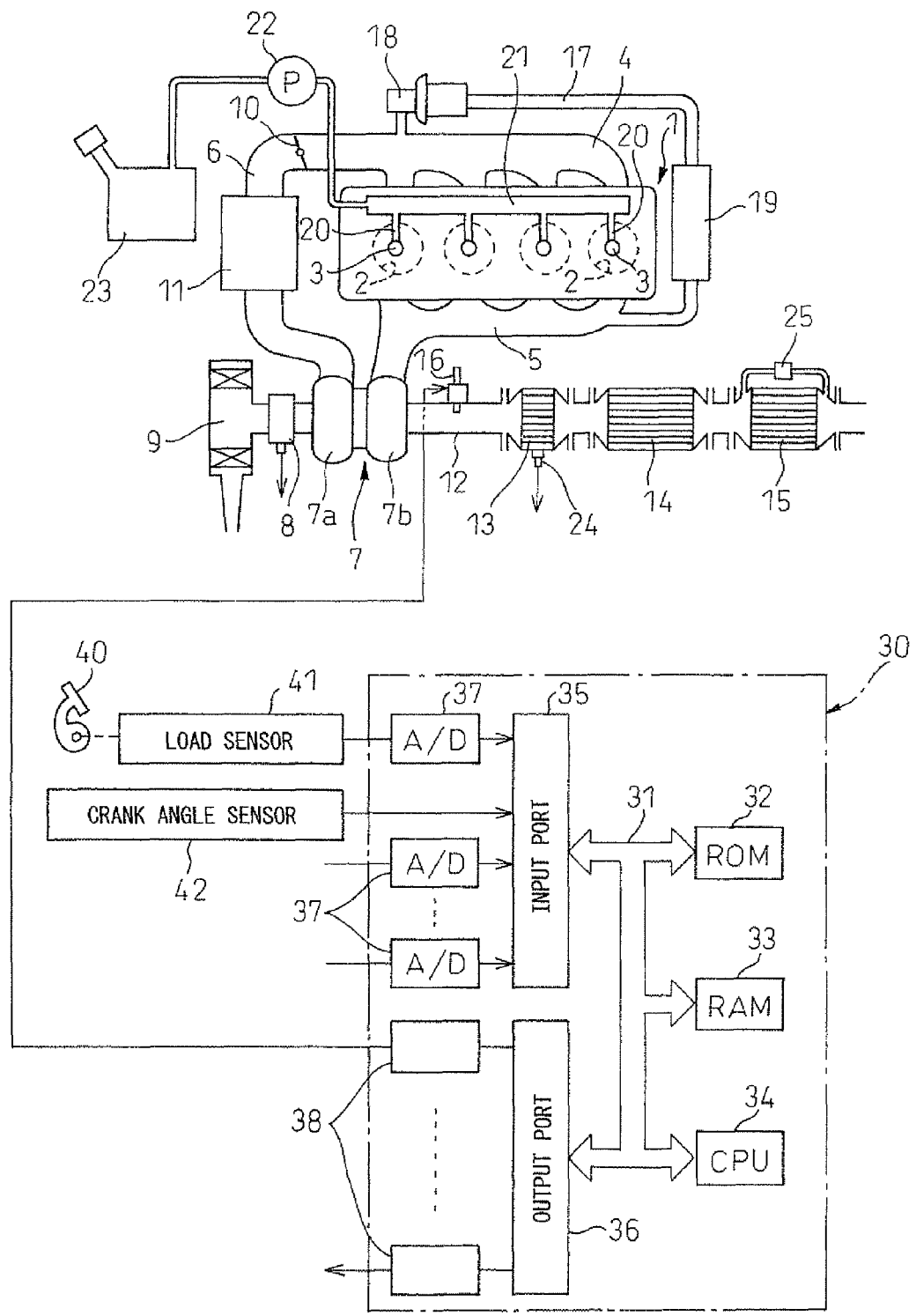
FIG. 1 is an overall view of a compression ignition type internal combustion engine.

FIG. 1 is an overall view of a compression ignition type internal combustion engine.

Referring to FIG. 1, 1 indicates an engine body, 2a combustion chamber of each cylinder, 3 an electronically controlled fuel injector for injecting fuel into each combustion chamber 2, 4 an intake manifold, and 5 an exhaust manifold. The intake manifold 4 is connected through an intake duct 6 to an outlet of a compressor 7a of an exhaust turbocharger 7, while an inlet of the compressor 7a is connected through an intake air amount detector 8 to an air cleaner 9. Inside the intake duct 6, a throttle valve 10 driven by a step motor is arranged. Furthermore, around the intake duct 6, a cooling device 11 is arranged for cooling the intake air which flows through the inside of the intake duct 6. In the embodiment shown in FIG. 1, the engine cooling water is guided to the inside of the cooling device 11 where the engine cooling water is used to cool the intake air.

On the other hand, the exhaust manifold 5 is connected to an inlet of an exhaust turbine 7b of the exhaust turbocharger 7. The outlet of the exhaust turbine 7b is connected through an exhaust pipe 12 to a hydrocarbon partial oxidation catalyst 13 which is able to partially oxidize the hydrocarbons HC. In the embodiment shown in FIG. 1, this hydrocarbon partial oxidation catalyst 13 is comprised of an oxidation catalyst. An outlet of the hydrocarbon partial oxidation catalyst, that is, the oxidation catalyst 13, is connected to an inlet of an exhaust purification catalyst 14, while the outlet of the exhaust purification catalyst 14 is connected to a particulate filter 15 for trapping particulate matter contained in the exhaust gas. Inside the exhaust pipe 12 upstream of the oxidation catalyst 13, a hydrocarbon feed valve 16 is arranged for feeding hydrocarbons comprised of diesel oil or other fuel used as fuel for a compression ignition type internal combustion engine. In the embodiment shown in FIG. 1, diesel oil is used as the hydrocarbons which are fed from the hydrocarbon feed valve 16. Note that, the present invention can also be applied to a spark ignition type internal combustion engine in which fuel is burned under a lean air-fuel ratio. In this case, from the hydrocarbon feed valve 16, hydrocarbons comprised of gasoline or other fuel used as fuel of a spark ignition type internal combustion engine are fed.

On the other hand, the exhaust manifold 5 and the intake manifold 4 are connected with each other through an exhaust gas recirculation (hereinafter referred to as an "EGR") passage 17. Inside the EGR passage 17, an electronically controlled EGR control valve 18 is arranged. Further, around the EGR passage 17, a cooling device 19 is arranged for cooling EGR gas flowing through the inside of the EGR passage 17. In the embodiment shown in FIG. 1, the engine cooling water is guided to the inside of the cooling device 19 where the engine cooling water is used to cool the EGR gas. On the other hand, each fuel injector 3 is connected through a fuel feed tube 20 to a common rail 21. This common rail 21 is connected through an electronically controlled variable discharge fuel pump 22 to a fuel tank 23. The fuel which is stored inside of the fuel tank 23 is fed by the fuel pump 23 to the inside of the common rail 21. The fuel which is fed to the inside of the common rail 21 is fed through each fuel feed tube 20 to the fuel injector 3.

An electronic control unit 30 is comprised of a digital computer provided with a ROM (read only memory) 32, a RAM (random access memory) 33, a CPU (microprocessor) 34, an input port 35, and an output port 36, which are connected with each other by a bidirectional bus 31. At the oxidation catalyst 13, a temperature sensor 24 is attached for detecting the temperature of the oxidation catalyst 13. At the particulate filter 15, a differential pressure sensor 25 is attached for detecting a differential pressure before and after the particulate filter 15. The output signals of these temperature sensor 24, differential pressure sensor 25, and intake air amount detector 8 are input through respectively corresponding AD converters 37 to the input port 35. Further, the accelerator pedal 40 has a load sensor 41 connected to it which generates an output voltage proportional to the amount of depression L of the accelerator pedal 40. The output voltage of the load sensor 41 is input through a corresponding AD converter 37 to the input port 35. Furthermore, at the input port 35, a crank angle sensor 42 is connected which generates an output pulse every time a crankshaft rotates by, for example, 15°. On the other hand, the output port 36 is connected through corresponding drive circuits 38 to each fuel injector 3, a step motor for driving the throttle valve 10, hydrocarbon feed valve 16, EGR control valve 18, and fuel pump 22.

Figure 2:
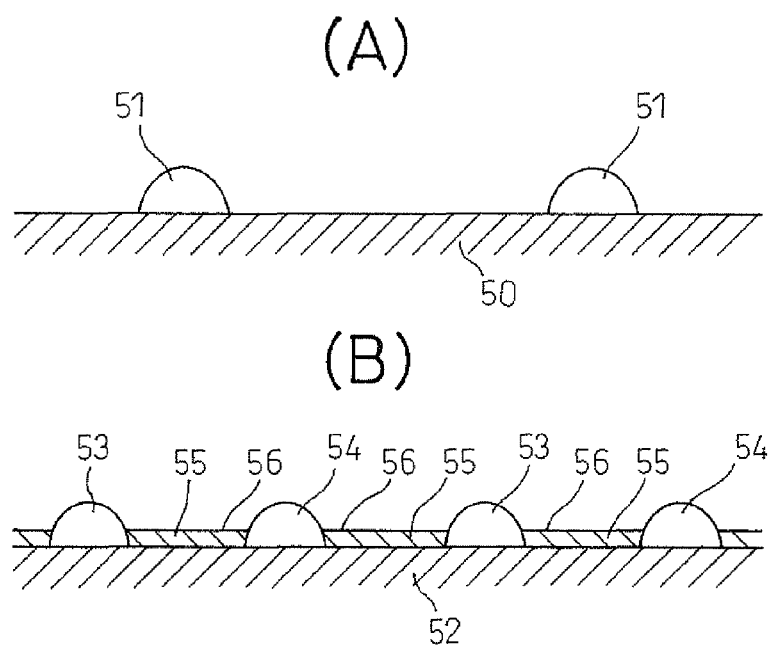
FIG. 2 is a view schematically showing a surface part of a catalyst carrier.

FIG. 2(A) schematically shows a surface part of a catalyst carrier carried on a substrate of an oxidation catalyst 13. As shown in FIG. 2(A), for example, a catalyst 51 comprised of platinum Pt or another such precious metal or silver Ag or copper Cu or other such transition metal is carried on a catalyst carrier 50 comprised of alumina.

On the other hand, FIG. 2(B) schematically shows a surface part of a catalyst carrier which is carried on a substrate of the exhaust purification catalyst 14. At this exhaust purification catalyst 14, as shown in FIG. 2(B), for example, there is provided a catalyst carrier 52 made of alumina on which precious metal catalysts 53 and 54 are carried. Furthermore, on this catalyst carrier 52, a basic layer 55 is formed which includes at least one element selected from potassium K, sodium Na, cesium Cs, or another such alkali metal, barium Ba, calcium Ca, or another such alkali earth metal, a lanthanoid or another such rare earth and silver Ag, copper Cu, iron Fe, iridium Ir, or another metal able to donate electrons to $NO_x$. The exhaust gas flows along the top of the catalyst carrier 52, so the precious metal catalysts 53 and 54 can be said to be carried on the exhaust gas flow surface of the exhaust purification catalyst 14. Further, the surface of the basic layer 55 exhibits basicity, so the surface of the basic layer 55 is called the basic exhaust gas flow surface part 56.

In FIG. 2(B), the precious metal catalyst 53 is comprised of platinum Pt, while the precious metal catalyst 54 is comprised of rhodium Rh. That is, the precious metal catalysts 53 and 54 which are carried on the catalyst carrier 52 are comprised of platinum Pt and rhodium Rh. Note that, on the catalyst carrier 52 of the exhaust purification catalyst 14, in addition to platinum Pt and rhodium Rh, palladium Pd may be further carried or, instead of rhodium Rh, palladium Pd may be carried. That is, the precious metal catalysts 53 and 54 which are carried on the catalyst carrier 52 are comprised of platinum Pt and at least one of rhodium Rh and palladium Pd.

When hydrocarbons are injected from the hydrocarbon feed valve 16 into the exhaust gas, the hydrocarbons are oxidized on the oxidation catalyst 13. In the present invention, at this time, the hydrocarbons are partially oxidized at the oxidation catalyst 13 and the partially oxidized hydrocarbons are used to remove the $NO_x$ at the exhaust purification catalyst 14. In this case, if making the oxidizing strength of the oxidation catalyst 13 too strong, the hydrocarbons end up being oxidized without being partially oxidized at the oxidation catalyst 13. To make the hydrocarbons partially oxidize, it is necessary to weaken the oxidizing strength of the oxidation catalyst 13. Therefore, in an embodiment of the present invention, as an oxidation catalyst 13, a catalyst with a little carried amount of the precious metal catalyst, a catalyst carrying a base metal, or a catalyst with a small volume is used.

Figure 3:
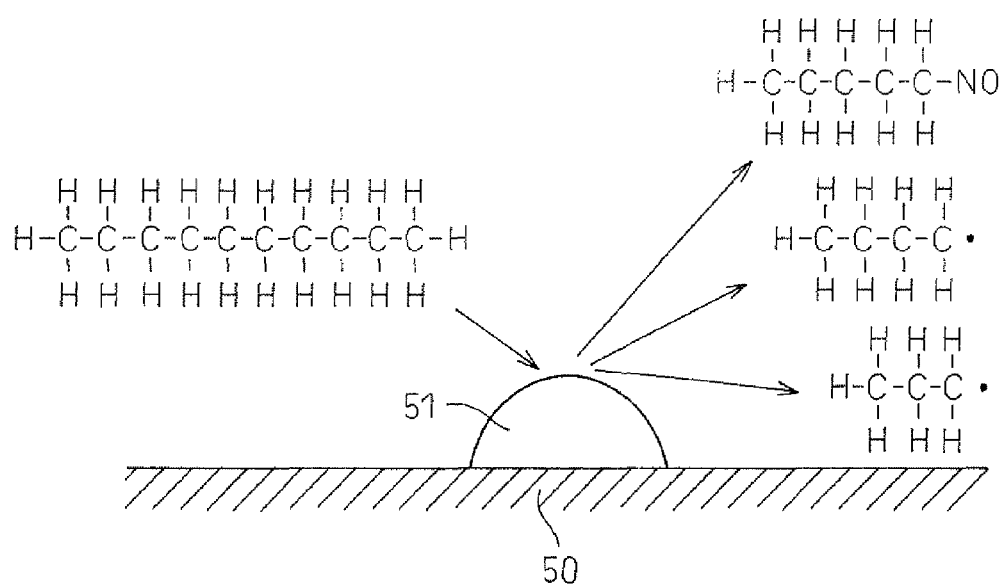
FIG. 3 is a view for explaining an oxidation reaction in an oxidation catalyst.

FIG. 3 schematically shows an oxidation reaction which is performed in the oxidation catalyst 13. As shown in FIG. 3, the hydrocarbons HC which are injected from the hydrocarbon feed valve 16 become radical hydrocarbons HC with a small carbon number due to the catalyst 51. Note that, at this time, part of the hydrocarbons HC bond with the NO to become nitroso compounds such as shown in FIG. 3, while part of the hydrocarbons HC bond with $NO_2$ to form nitro compounds. These radical hydrocarbons etc. produced at the oxidation catalyst 13 are sent to the exhaust purification catalyst 14.

Figure 4:
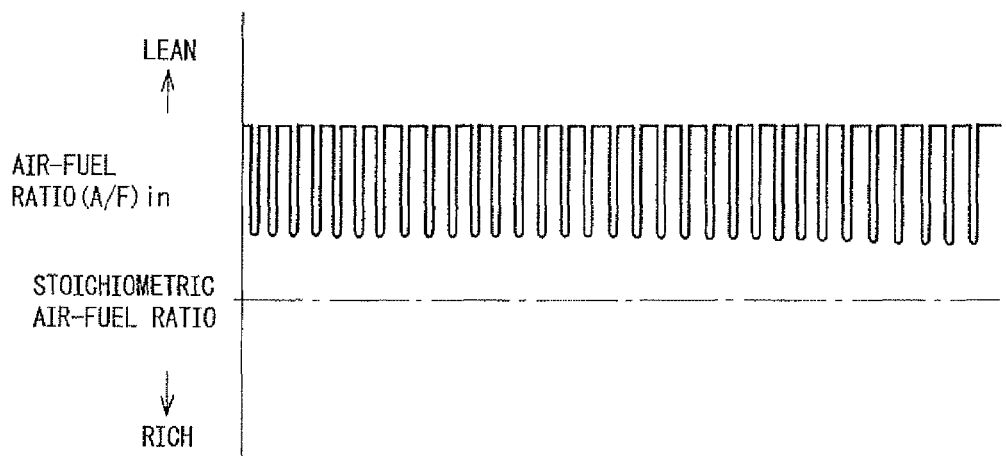
FIG. 4 is a view showing a change of an air-fuel ratio of exhaust gas flowing into an exhaust purification catalyst.
Figure 5:
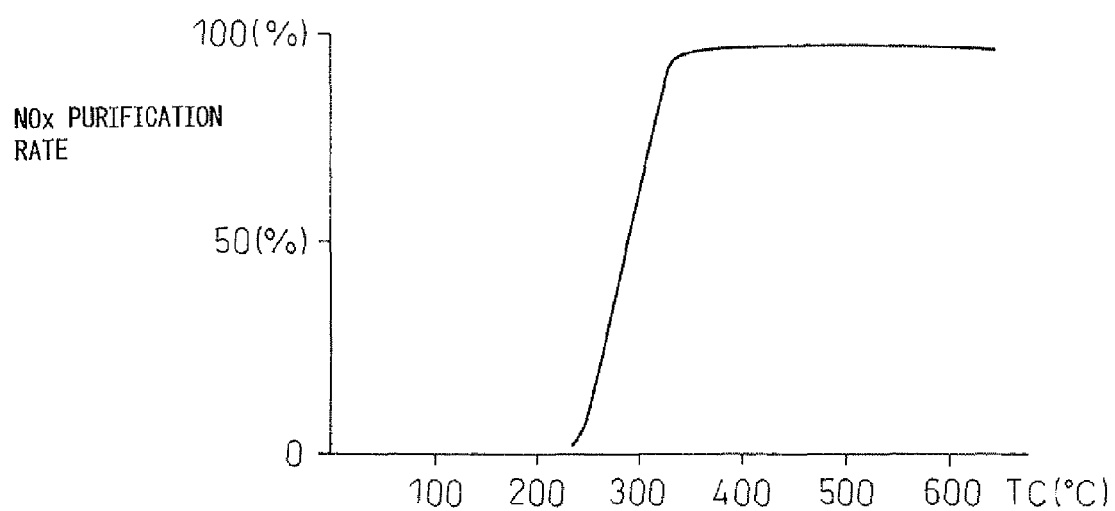
FIG. 5 is a view showing an $NO_x$ purification rate.

On the other hand, FIG. 4 shows the changes in the air-fuel ratio (A/F) in of the exhaust gas flowing into the exhaust purification catalyst 14, while FIG. 5 shows the $NO_x$ purification rate by the exhaust purification catalyst 14 at the time of changing the air-fuel ratio (A/F) in of the exhaust gas flowing into the exhaust purification catalyst 14, such as shown in FIG. 4, for the different catalyst temperatures TC of the exhaust purification catalyst 14. The inventors engaged in research on $NO_x$ purification over a long period of time and, in the process of research, learned that, as shown in FIG. 4, if intermittently lowering the air-fuel ratio (A/F) in of the exhaust gas flowing into the exhaust purification catalyst 14 by later explained certain time intervals within a range of a lean air-fuel ratio, an extremely high $NO_x$ purification rate is obtained even in a 400° C. or more high temperature region as shown in FIG. 5.

Furthermore, it was learned that, at this time, a large amount of a reducing intermediate containing nitrogen and hydrocarbons continues to be held or adsorbed on the surface of the basic layer 55, that is, on the basic exhaust gas flow surface part 56 of the exhaust purification catalyst 14, and this reducing intermediate plays a central role in obtaining a high $NO_x$ purification rate. Note that, these FIGS. 6(A) and 6(B) schematically show the surface part of the catalyst carrier 52 of the exhaust purification catalyst 14. These FIGS. 6(A) and 6(B) show the reaction which is presumed to occur when the air-fuel ratio (A/F) in of the exhaust gas flowing into the exhaust purification catalyst 14 is intermittently reduced within the range of a lean air-fuel ratio.

That is, as will be understood from FIG. 4, the air-fuel ratio of the exhaust gas flowing into the exhaust purification catalyst 14 is maintained lean, so the exhaust gas which flows into the exhaust purification catalyst 14 becomes a state of oxygen excess. Therefore, the NO which is contained in the exhaust gas, as shown in FIG. 6(A), is oxidized on the platinum 53 and becomes $NO_2$. Next, this $NO_2$ is further oxidized and becomes stable nitrate ions $NO_3^-$.

On the other hand, when nitrates $NO_3^-$ are produced, the nitrates $NO_3^-$ are pulled back in a direction of reduction by the hydrocarbons HC which are sent on to the surface of the basic layer 55, have the oxygen disassociated, and become unstable $NO_2^*$. This unstable $NO_2^*$ is strong in activity. Below, this unstable $NO_2^-$ is called the active $NO_2^*$. This active $NO_2^*$, as shown in FIG. 6(A), reacts with the mainly radical hydrocarbons HC which are adhered on the surface of the basic layer 55 or on the rhodium Rh 54 or the mainly radical hydrocarbons HC contained in the exhaust gas on the rhodium Rh 54, whereby a reducing intermediate is produced. This reducing intermediate is adhered or adsorbed on the surface of the basic layer 55.

Note that, at this time, the first produced reducing intermediate is considered to be a nitro compound R—$NO_2$. If this nitro compound R—$NO_2$ is produced, the result becomes a nitrile compound R—CN, but this nitrile compound R—CN can only survive for an instant in this state, so immediately becomes an isocyanate compound R—NCO. However, in this case, what is hydrolyzed is considered to be part of the isocyanate compound R—NCO. Therefore, as shown in FIG. 6(A), it is believed that the majority of the reducing intermediate which is held or adsorbed on the surface of the basic layer 55 is the isocyanate compound R—NCO and amine compound R—$NH_2$.

On the other hand, as shown in FIG. 6(B), the produced active $NO_2^*$ reacts with the reducing intermediate R—NCO or R—$NH_2$ on the rhodium Rh 54 to form $N_2$, $CO_2$, and $H_2O$ and consequently the $NO_x$ is removed. That is, if no reducing intermediate R—NCO or R—$NH_2$ is held or adsorbed on the basic layer 55, the $NO_x$ is not removed. Therefore, to obtain a high $NO_x$ purification rate, it is necessary to ensure the continuous presence of a sufficient amount of the reducing intermediate R—NCO or R—$NH_2$ for making the produced active $NO_2^*$ $N_2$, $CO_2$, and $H_2O$ on the basic layer 55, that is, the basic exhaust gas flow surface part 26, at all times.

That is, as shown in FIGS. 6(A) and 6(B), to oxidize the NO on the platinum Pt 53, the air-fuel ratio (A/F) in of the exhaust gas must be lean. It is necessary to hold a sufficient amount of the reducing intermediate R—NCO or R—$NH_2$ for making the active $NO_2^*$ produce $N_2$, $CO_2$, and $H_2O$ on the surface of the basic layer 55, that is, it is necessary to provide the basic exhaust gas flow surface part 26 for holding the reducing intermediate R—NCO or R—$NH_2$.

Therefore, in this embodiment according to the present invention, to react the $NO_x$ which is contained in the exhaust gas and the partially oxidized hydrocarbons and produce a reducing intermediate R—NCO or R—$NH_2$ containing nitrogen and hydrocarbon, the precious metal catalysts 53 and 54 are carried on the exhaust gas flow surface of the exhaust purification catalyst 14. To hold the produced reducing intermediate R—NCO or R—$NH_2$ in the exhaust purification catalyst 14, the basic exhaust gas flow surface part 26 is formed around the precious metal catalysts 53 and 54. The $NO_x$ is reduced by the reducing action of the reducing intermediate R—NCO or R—$NH_2$ held on the basic exhaust gas flow surface part 26. Hydrocarbons HC are intermittently fed from the hydrocarbon feed valve 16 by predetermined feed intervals while maintaining the air-fuel ratio of the exhaust gas flowing into the exhaust purification catalyst 14 lean. The predetermined feed intervals of the hydrocarbons HC are made the feed intervals required for continuing to ensure the presence of the reducing intermediate R—NCO or R—$NH_2$ on the basic exhaust gas flow surface part 56.

In this case, if the injection amount becomes too large or the injection interval becomes too short, the amount of hydrocarbons becomes excessive and a large amount of hydrocarbons HC is exhausted from the exhaust purification catalyst 14, while if the injection amount becomes too small or the injection interval becomes too long, the reducing intermediate R—NCO or R—$NH_2$ can no longer remain on the basic exhaust gas flow surface part 56. Therefore, in this case, what is important is setting the injection amount and injection interval of hydrocarbons so that no excess hydrocarbons HC are exhausted from the exhaust purification catalyst 14 and so that the reducing intermediate R—NCO or the R—$NH_2$ continues to be present on the basic exhaust gas flow surface part 26. Incidentally, in the example shown in FIG. 4, the injection interval is made 3 seconds.

If making the feed intervals of the hydrocarbons HC longer than the above-mentioned predetermined feed intervals, the hydrocarbons HC and the reducing intermediate R—NCO or R—$NH_2$ disappear from the surface of the basic layer 55. At this time, no pullback force acts in a direction reducing nitrate ions $NO_3^-$ at the nitrate ions $NO_3^-$ produced on the platinum Pt 53. Therefore, at this time, the nitrate ions $NO_3^-$ diffuse in the basic layer 55 and become nitrates as shown in FIG. 7(A). That is, at this time, the $NO_x$ in the exhaust gas is absorbed in the form of nitrates inside the basic layer 55.

On the other hand, FIG. 7(B) shows the case where the air-fuel ratio of the exhaust gas which flows into the exhaust purification catalyst 14 is made the stoichiometric air-fuel ratio or rich when the $NO_x$ is absorbed in the form of nitrates inside of the basic layer 55. In this case, the oxygen concentration in the exhaust gas falls, so the reaction proceeds in the opposite direction ($NO_3^- \rightarrow NO_2$) and consequently the nitrates absorbed in the basic layer 55 gradually become nitrate ions $NO_3^-$ and, as shown in FIG. 7(B), are released from the basic layer 55 in the form of $NO_2$. Next, the released $NO_2$ is reduced by the hydrocarbons HC and CO contained in the exhaust gas.

Figure 8:
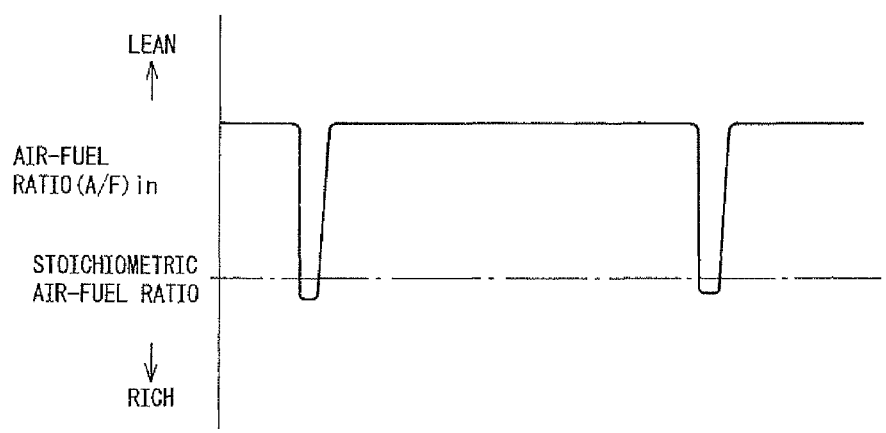
FIG. 8 is a view showing a change of an air-fuel ratio of exhaust gas flowing into an exhaust purification catalyst.

FIG. 8 shows the case of making the air-fuel ratio (A/F) in of the exhaust gas which flows into the exhaust purification catalyst 14 temporarily rich slightly before the $NO_x$ absorption ability of the basic layer 55 becomes saturated. Note that, in the example shown in FIG. 8, the time interval of this rich control is 1 minute or more. In this case, when the air-fuel ratio (A/F) in of the exhaust gas is lean, the $NO_x$ which is absorbed in the basic layer 55 is released all at once from the basic layer 55 and reduced when the air-fuel ratio (A/F) in of the exhaust gas is temporarily made rich. Therefore, in this case, the basic layer 55 performs the role of an absorbent for temporarily absorbing $NO_x$. Note that, at this time, sometimes the basic layer 55 temporarily adsorbs the $NO_x$. Therefore, if using term of storage as a term including both absorption and adsorption, at this time, the basic layer 55 performs the role of an $NO_x$ storage agent for temporarily storing the $NO_x$.

That is, if the ratio of the air and fuel (hydrocarbons) which are fed into the engine intake passage, combustion chambers 2, and exhaust passage upstream of the exhaust purification catalyst 14 is called the air-fuel ratio of the exhaust gas, in this case, the exhaust purification catalyst 14 functions as an $NO_x$ storage catalyst which stores the $NO_x$ when the air-fuel ratio of the exhaust gas is lean and releases the stored $NO_x$ when the oxygen concentration in the exhaust gas falls.

Figure 9:
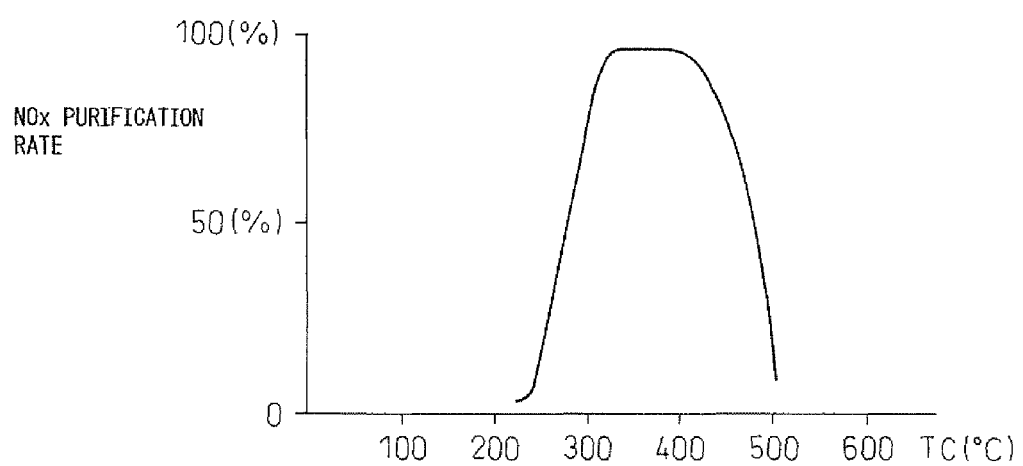
FIG. 9 is a view of an $NO_x$ purification rate.

FIG. 9 shows the $NO_x$ purification rate when making the exhaust purification catalyst 14 function as an $NO_x$ storage catalyst in this way. Note that, the abscissa of the FIG. 9 shows the catalyst temperature TC of the exhaust purification catalyst 14. When making the exhaust purification catalyst 14 function as an $NO_x$ storage catalyst, as shown in FIG. 9, when the catalyst temperature TC is 300° C. to 400° C., an extremely high $NO_x$ purification rate is obtained, but when the catalyst temperature TC becomes a 400° C. or higher high temperature, the $NO_x$ purification rate falls.

In this way, when the catalyst temperature TC becomes 400° C. or more, the $NO_x$ purification rate falls because if the catalyst temperature TC becomes 400° C. or more, the nitrates break down by heat and are released in the form of $NO_2$ from the exhaust purification catalyst 14. That is, so long as storing $NO_x$ in the form of nitrates, when the catalyst temperature TC is high, it is difficult to obtain a high $NO_x$ purification rate. However, in the new $NO_x$ purification method shown from FIG. 4 to FIGS. 6(A) and 6(B), as will be understood from FIGS. 6(A) and 6(B), nitrates are not formed or even if formed are extremely fine in amount, consequently, as shown in FIG. 5, even when the catalyst temperature TC is high, a high $NO_x$ purification rate is obtained.

Therefore, in the present invention, the precious metal catalysts 53 and 54 are carried on the exhaust gas flow surface of the exhaust purification catalyst 14. Around the precious metal catalysts 53 and 54, the basic exhaust gas flow surface part 56 is formed. The exhaust purification catalyst 14 has the property of reducing the $NO_x$ which is contained in the exhaust gas when hydrocarbons are injected from the hydrocarbon feed valve 16 at predetermined feed intervals while maintaining the air-fuel ratio of the exhaust gas flowing into the exhaust purification catalyst 14 lean and has the property of being increased in storage amount of $NO_x$ which is contained in the exhaust gas when the feed intervals of the hydrocarbons are longer than the predetermined feed intervals. At the time of engine operation, hydrocarbons are injected from the hydrocarbon feed valve 16 at said predetermined feed intervals while maintaining the air-fuel ratio of the exhaust gas flowing into the exhaust purification catalyst 14 lean. Due to this, the $NO_x$ which is contained in the exhaust gas is reduced in the exhaust purification catalyst 14.

That is, the $NO_x$ purification method which is shown from FIG. 4 to FIGS. 6(A) and 6(B) can be said to be a new $NO_x$ purification method designed to remove $NO_x$ without forming almost any nitrates in the case of using an exhaust purification catalyst which carries a precious metal catalyst and forms a basic layer which can absorb $NO_x$. In actuality, when using this new $NO_x$ purification method, the nitrates which are detected from the basic layer 55 become much smaller in amount compared with the case where making the exhaust purification catalyst 14 function as an $NO_x$ storage catalyst.

Next, referring to FIGS. 10(A) and (B) to FIG. 12, the $NO_x$ purification control by the new $NO_x$ purification method shown in FIG. 4 to FIGS. 6(A) and (B) will be explained.

FIG. 10(A) shows the relationship between the per unit time hydrocarbon injection amount W and the oxygen concentration D in the exhaust gas, while FIG. 10(B) shows the relationship between the per unit time hydrocarbon injection amount W and the intake air amount GA. If the oxygen concentration in the exhaust gas becomes higher, the amount of hydrocarbons HC which react with the oxygen becomes greater than the amount of hydrocarbons HC which react with the active $NO_2$* and therefore the amount of the produced reducing intermediate R—NCO or R—$NH_2$ ends up falling. Therefore, in this embodiment according to the present invention, as shown in FIG. 10(A), the amount W of hydrocarbons fed per unit time from the hydrocarbon feed valve 16 is increased the higher the oxygen concentration D in the exhaust gas so that the amount of the reducing intermediate R—NCO or R—$NH_2$ does not fall.

On the other hand, if the intake air amount GA increases, the density of the hydrocarbons HC will become smaller and the amount of production of the reducing intermediate R—NCO or R—$NH_2$ will end up falling. Therefore, in this embodiment according to the present invention, to prevent the amount of reducing intermediate R—NCO or R—$NH_2$ from decreasing, as shown in FIG. 10(B), the amount W of hydrocarbons fed per unit time from the hydrocarbon feed valve 16 is increased the greater the intake air amount GA.

Figure 11:
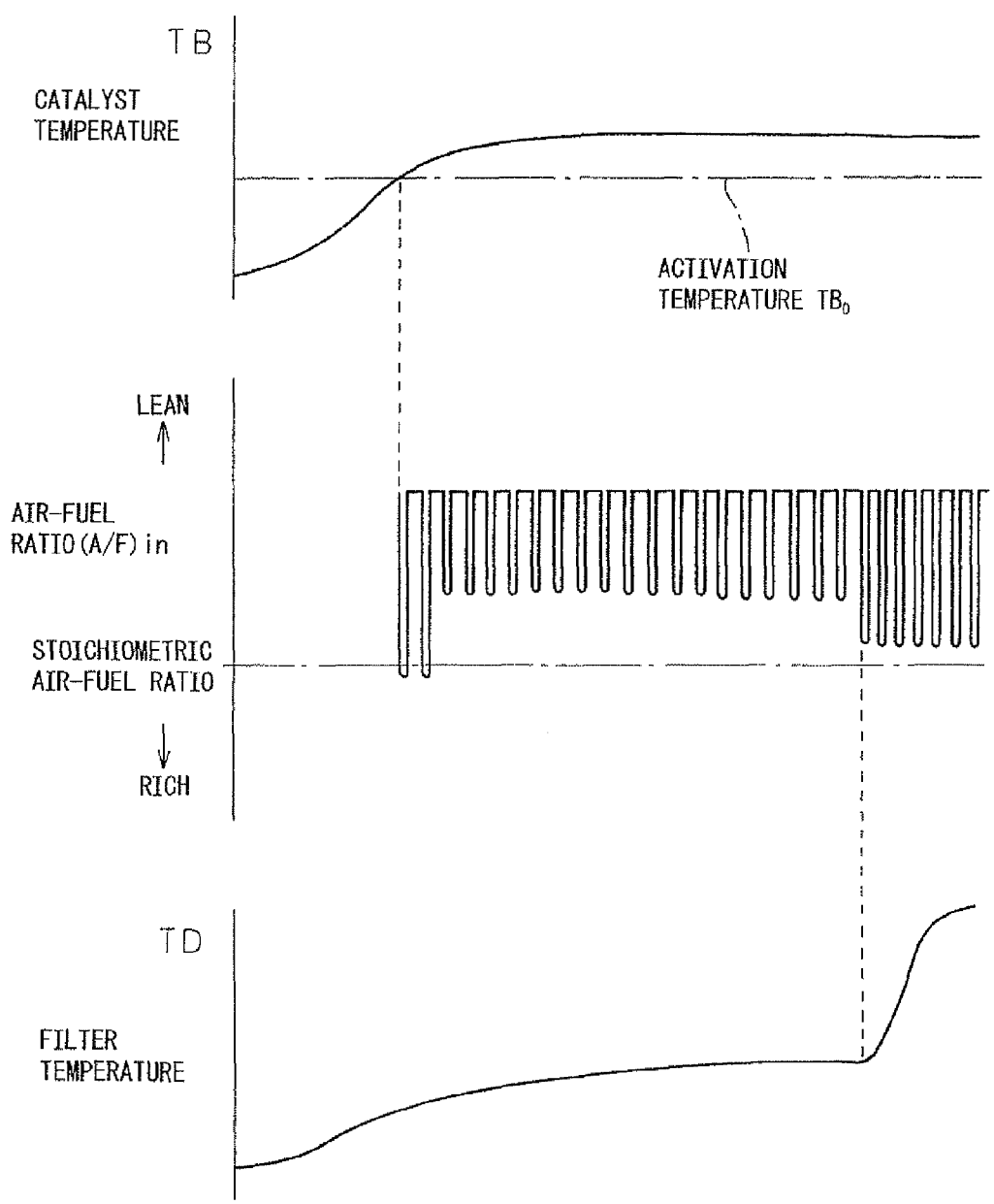
FIG. 11 is a time chart showing changes in the air-fuel ratio of exhaust gas flowing to an exhaust purification catalyst etc.

FIG. 11 shows the changes in the temperature TB of the oxidation catalyst 13, the changes in the air-fuel ratio (A/F) in of the exhaust gas flowing into the exhaust purification catalyst 14, and the changes of the temperature TD of the particulate filter 15, from right after engine startup.

As shown in FIG. 11, right after engine startup, the temperature TB of the oxidation catalyst 13 is low. At this time, if assuming the temperature TB of the oxidation catalyst 13 is less than the activation temperature $TB_0$, no partial oxidation reaction of the hydrocarbons HC will be performed by the oxidation catalyst 13. If no partial oxidation reaction of the hydrocarbons HC is performed, no action of producing the reducing intermediate R—NCO or R—$NH_2$ at the exhaust purification catalyst 14 will be performed either. Therefore, in this embodiment according to the present invention, the feed of hydrocarbons for performing the new $NO_x$ purification method shown in FIG. 4 to FIGS. 6(A) and (B) is stopped until the temperature TB of the oxidation catalyst 13 reaches the activation temperature $TB_0$. That is, in this embodiment according to the present invention, the action of feeding hydrocarbons HC performed for ensuring the continued presence of the reducing intermediate R—NCO or R—$NH_2$ on the basic exhaust gas flow surface part 26 is started after the activation of the oxidation catalyst 13.

On the other hand, if the temperature of the exhaust purification catalyst 14 rises by a certain extent after engine startup and before the temperature TB of the oxidation catalyst 13 reaches the activation temperature $TB_0$, the $NO_x$ in the exhaust gas will start to be absorbed at the exhaust purification catalyst 14. Therefore, around when the temperature TB of the oxidation catalyst 13 reaches the activation temperature $TB_0$, the inside of the exhaust purification catalyst 14 will have absorbed a certain extent of amount of $NO_x$. If the feed of hydrocarbons is started and the temperature of the exhaust purification catalyst 14 rises at the time of such a state, the $NO_x$ which is absorbed at the exhaust purification catalyst 14 will be rapidly released. Therefore, at this time, it is necessary to increase the feed of hydrocarbons by exactly the amount necessary for reducing the released $NO_x$ so as to remove the released $NO_x$ well.

Therefore, in this embodiment according to the present invention, at the time of start of the action of feeding hydrocarbons performed for ensuring the continued presence of the reducing intermediate R—NCO or R—$NH_2$ on the basic exhaust gas flow surface part 26, as will be understood from FIG. 11, the amount of hydrocarbons which is fed from the hydrocarbon feed valve 16 per unit time is increased. Note that, at this time, in the example shown in FIG. 11, the amount of hydrocarbons fed per injection is increased so that the air-fuel ratio (A/F) in of the exhaust gas becomes rich.

On the other hand, there is a possibility of the exhaust purification catalyst 14 storing the sulfur content contained in exhaust gas. To remove the stored sulfur content, the exhaust purification catalyst 14 has to be raised in temperature. Further, in the embodiment shown in FIG. 1, if the amount of the particulate matter which is trapped on the particulate filter 15 becomes a certain amount or more, for example, if the differential pressure before and after the particulate filter 15 which is detected by the differential pressure sensor 25 becomes a certain pressure or more, the temperature of the particulate filter 15 is made to rise to burn the trapped particulate matter.

In this embodiment according to the present invention, in such a case, that is, when the exhaust purification catalyst 14 should be raised in temperature or when the particulate filter 15 arranged inside of the engine exhaust passage should be raised in temperature, the amount of hydrocarbons which is fed from the hydrocarbon feed valve 16 per unit time is made to increase. Note that, at this time, in the example shown in FIG. 11, the amount of hydrocarbons injected per injection is increased and the injection intervals of the hydrocarbons are made shorter.

Figure 12:
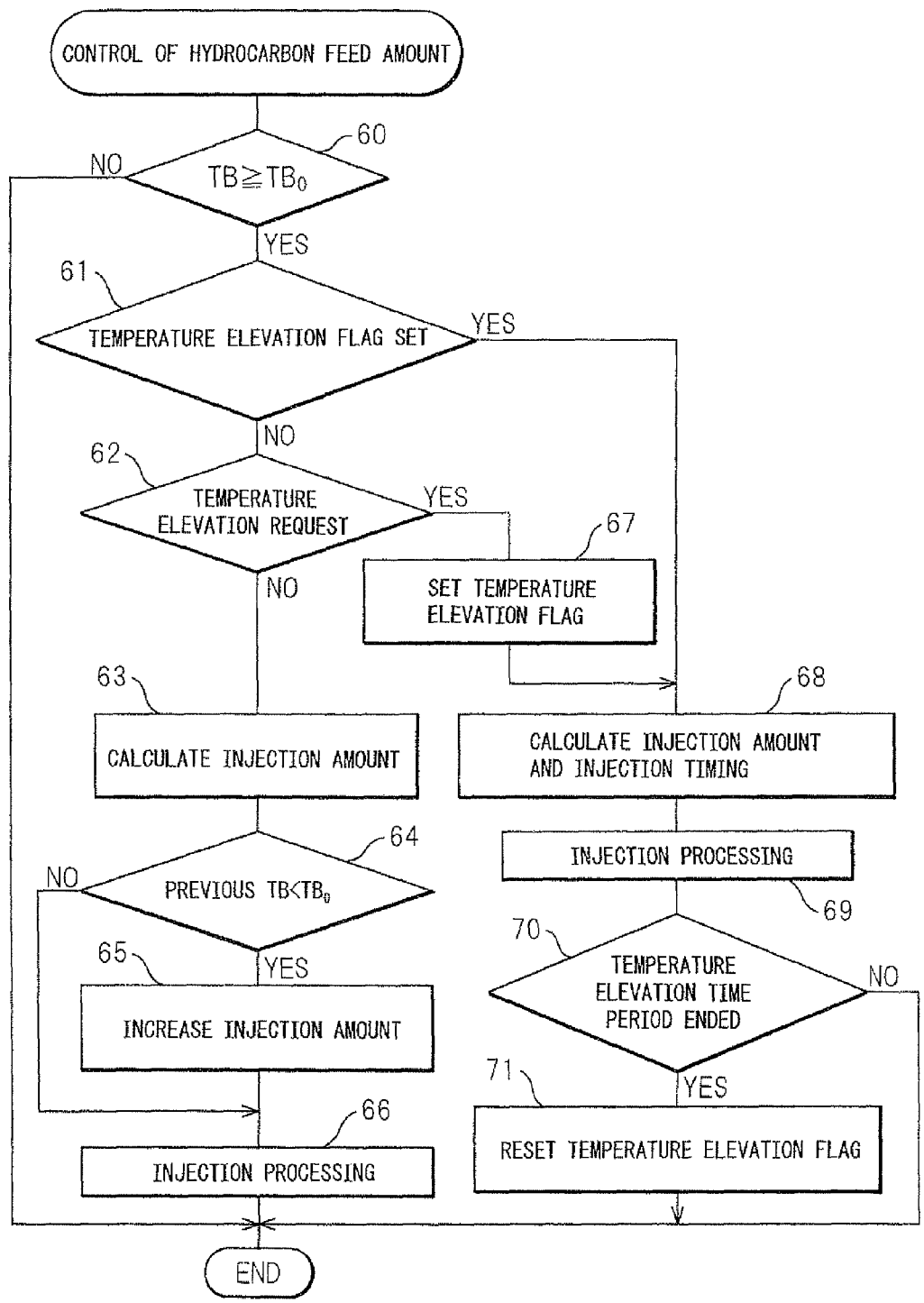
FIG. 12 is a flow chart for control of injection of hydrocarbons.

FIG. 12 shows the control routine for injection of hydrocarbons. This routine is executed by interruption every predetermined time.

Referring to FIG. 12, first, at step 60, it is judged if the temperature TB of the oxidation catalyst 13 is the activation temperature $TB_0$ or more. When $TB<TB_0$, the processing cycle is ended, while when $TB \geq TB_0$, the routine proceeds to step 61 where it is judged if a temperature elevation flag has been set. When the temperature elevation flag has not been set, it is judged whether a temperature elevation request showing that the exhaust purification catalyst 14 or the particulate filter 15 should be raised in temperature has been made. When no temperature elevation request has been made, the routine proceeds to step 63.

At step 63, the injection amount of hydrocarbons per injection from the hydrocarbon feed valve 16 is calculated. Next, at step 64, it is judged if $TB<TB_0$ at the time of the previous interruption. When $TB<TB_0$ at the time of the previous interruption, that is, when the temperature TB of the oxidation catalyst 13 becomes the activation temperature $TB_0$ or more, the routine proceeds to step 65 where the amount of increase of the injection amount of hydrocarbons per injection is calculated. Next, the routine proceeds to step 66 where the processing for injection of hydrocarbons is performed. On the other hand, when it is judged at step 64 that $TB \geq TB_0$ even at the time of the previous interruption, the routine jumps to step 66 where processing for injection of hydrocarbons is performed.

On the other hand, when it is judged at step 62 that the temperature elevation request has been made, the routine proceeds to step 67 where the temperature elevation flag is set, then the routine proceeds to step 68. When the temperature elevation flag is set, from the next processing cycle, the routine jumps from step 61 to at step 68. At step 68, the injection amount of hydrocarbons per injection and the injection intervals at the time of temperature elevation are calculated, next, at step 69, processing for injection of hydrocarbons is performed. Next, at step 70, it is judged if the time period for temperature elevation control has ended. When the time period for temperature elevation has ended, the routine proceeds to step 71 where the temperature elevation flag is reset.

Figure 13:
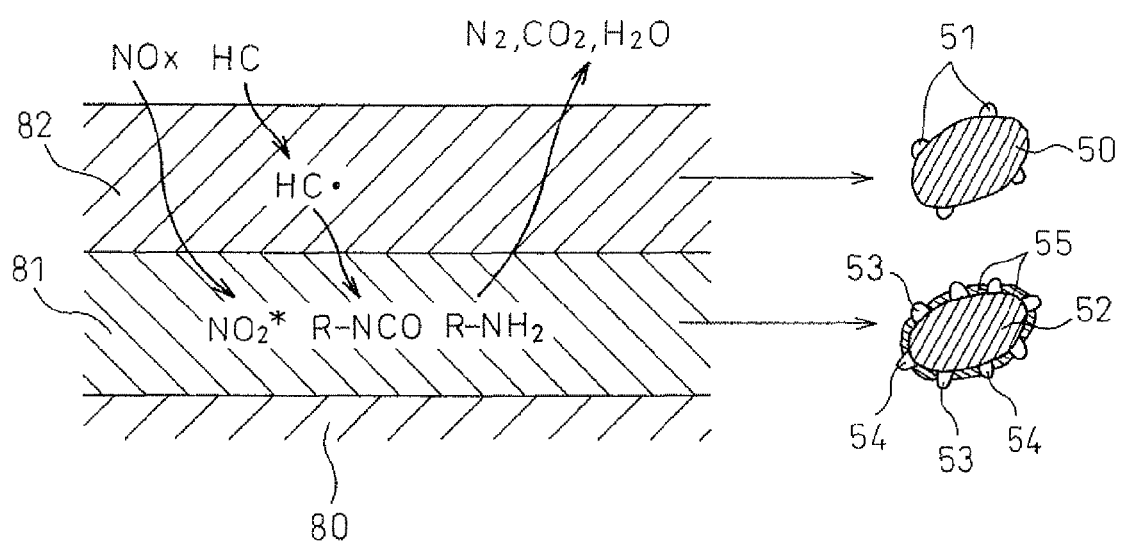
FIG. 13 is a partially enlarged view of another catalyst for purification of $NO_x$.

FIG. 13 shows the case where the hydrocarbon partial oxidation catalyst 13 and the exhaust purification catalyst 14 shown in FIG. 1 are formed from a single catalyst. This catalyst is, for example, provided with a large number of exhaust gas channels which extend in the flow direction of the exhaust gas. FIG. 13 shows an enlarged cross-sectional view of the surface part of the inner circumferential walls 80 of the exhaust gas channels of this catalyst. As shown in FIG. 13, a bottom coat layer 81 is formed on the surface of the inner circumferential walls 80 of the exhaust gas channels. A top coat layer 82 is formed on the bottom coat layer 81. In the example shown in FIG. 13, both of the coat layers 81 and 82 are comprised of powder aggregates. FIG. 13 shows an enlarged view of the powders forming the coat layers 81 and 82. From the enlarged view of the powders, it will be understood that the top coat layer 82 is comprised of the hydrocarbon partial oxidation catalyst shown in FIG. 2(A), for example, an oxidation catalyst, while the bottom coat layer 81 is comprised of the exhaust purification catalyst shown in FIG. 2(B).

When the catalyst shown in FIG. 13 is used, as shown in FIG. 13, the hydrocarbons HC which are contained in the exhaust gas diffuse in the top coat layer 82 and are partially oxidized. The partially oxidized hydrocarbons diffuse inside of the bottom coat layer 81. That is, in the example shown in FIG. 13 as well, in the same way as the example shown in FIG. 1, the hydrocarbon partial oxidation catalyst and the exhaust purification catalyst are arranged so that the hydrocarbons which are partially oxidized at the hydrocarbon partial oxidation catalyst flow into the exhaust purification catalyst. On the other hand, the $NO_x$ which is contained in exhaust gas diffuses inside the bottom coat layer 81 and becomes active $NO_2^*$. Inside the bottom coat layer 81, the reducing intermediate R—NCO or R—$NH_2$ is produced from the active $NO_2^*$ and the partially oxidize hydrocarbons. Further, the active $NO_2^*$ reacts with the reducing intermediate R—NCO or R—$NH_2$ to form $N_2$, $CO_2$, and $H_2O$.

On the other hand, as shown in FIG. 2(B), the catalyst carrier 52 of the exhaust purification catalyst 14 carries the precious metals 53 and 54. Therefore, inside of the exhaust purification catalyst 14 as well, the hydrocarbons can be reformed to radical hydrocarbons HC with a small carbon number. In this case, if it is possible for the hydrocarbons to be sufficiently reformed inside of the exhaust purification catalyst 14, that is, if it is possible for the hydrocarbons to be sufficiently partially oxidized inside of the exhaust purification catalyst 14, it is no longer be necessary to arrange the oxidation catalyst 13 upstream of the exhaust purification catalyst 14 such as shown in FIG. 1. Therefore, in one embodiment of the present invention, the oxidation catalyst 13 is not attached inside of an engine exhaust passage. Therefore, in this embodiment, the hydrocarbons which are injected from the hydrocarbon feed valve 16 are directly fed to the exhaust purification catalyst 14.

In this embodiment, the hydrocarbons which are injected from the hydrocarbon feed valve 16 are partially oxidized inside of the exhaust purification catalyst 14. Further, inside of the exhaust purification catalyst 14, active $NO_2^*$ is produced from the $NO_x$ which is contained in the exhaust gas. Inside of the exhaust purification catalyst 14, the reducing intermediate R—NCO or R—$NH_2$ is produced from the active $NO_2$* and partially oxidized hydrocarbons. Furthermore, the active $NO_2$* reacts with the reducing intermediate R—NCO or R—$NH_2$ to form $N_2$, $CO_2$, and $H_2O$. That is, in this embodiment, the exhaust purification catalyst 14 for reacting the $NO_x$ contained in the exhaust gas and the hydrocarbons which are injected from the hydrocarbon feed valve 16 and which are partially oxidized is arranged downstream of the hydrocarbon feed valve 16 inside of the engine exhaust passage.

REFERENCE SIGNS LIST

4 . . . intake manifold
5 . . . exhaust manifold
7 . . . exhaust turbocharger
12 . . . exhaust pipe
13 . . . oxidation catalyst
14 . . . exhaust purification catalyst
15 . . . particulate filter
16 . . . hydrocarbon feed valve

The invention claimed is:

1. An exhaust purification system of an internal combustion engine wherein a hydrocarbon feed valve for feeding hydrocarbons is arranged inside of an engine exhaust passage, an exhaust purification catalyst for reacting $NO_x$ contained in exhaust gas and hydrocarbons which are injected from the hydrocarbon feed valve and are partially oxidized is arranged in the engine exhaust passage downstream of the hydrocarbon feed valve, a precious metal catalyst is carried on the exhaust purification catalyst and a basic layer is formed on the exhaust purification catalyst, the exhaust purification catalyst has a property of reducing the $NO_x$ which is contained in the exhaust gas when hydrocarbons are injected from the hydrocarbon feed valve at predetermined feed intervals while maintaining an air-fuel ratio of an exhaust gas flowing into the exhaust purification catalyst lean and has a property of being increased in storage amount of $NO_x$ which is contained in the exhaust gas when the feed intervals of the hydrocarbons are longer than the predetermined feed intervals, and, at the time of engine operation, hydrocarbons are injected from the hydrocarbon feed valve at said predetermined feed intervals while maintaining the air-fuel ratio of the exhaust gas flowing into the exhaust purification catalyst lean, and thereby $NO_x$ which is contained in exhaust gas is reduced at the exhaust purification catalyst.

2. An exhaust purification system of an internal combustion engine as claimed in claim 1, wherein downstream of the hydrocarbon feed valve inside of the engine exhaust passage, said exhaust purification catalyst and a hydrocarbon partial oxidation catalyst which is able to partially oxidize the hydrocarbons which are injected from the hydrocarbon feed valve are arranged so that the hydrocarbons which are partially oxidized at the hydrocarbon partial oxidation catalyst flow into the exhaust purification catalyst.

3. An exhaust purification system of an internal combustion engine as claimed in claim 2, wherein said hydrocarbon partial oxidation catalyst is an oxidation catalyst which is arranged upstream of said exhaust purification catalyst inside of the engine exhaust passage.

4. An exhaust purification system of an internal combustion engine as claimed in claim 2, wherein a top coat layer comprised of said hydrocarbon partial oxidation catalyst is formed on a bottom coat layer comprised of said exhaust purification catalyst.

5. An exhaust purification system of an internal combustion engine as claimed in claim 1, wherein said precious metal catalyst is used to react $NO_x$ contained in the exhaust gas and partially oxidized hydrocarbons so as to produce a reducing intermediate containing nitrogen and hydrocarbons, the produced reducing intermediate is held at said basic exhaust gas flow surface part, $NO_x$ is reduced by the reducing action of the reducing intermediate held on the basic exhaust gas flow surface part, and said predetermined feed intervals of hydrocarbons are feed intervals required for ensuring a continued presence of the reducing intermediate on the basic exhaust gas flow surface part.

6. An exhaust purification system of an internal combustion engine as claimed in claim 1, wherein said precious metal catalysts are comprised of platinum Pt and at least one of rhodium Rh and palladium Pd.

7. An exhaust purification system of an internal combustion engine as claimed in claim 1, wherein on the exhaust gas flow surface of said exhaust purification catalyst, a basic layer is formed which includes an alkali metal, alkali earth metal, rare earth, or metal which can donate electrons to $NO_x$, and the surface of said basic layer forms said basic exhaust gas flow surface part.

8. An exhaust purification system of an internal combustion engine as claimed in claim 1, wherein an amount of hydrocarbons which is fed from the hydrogen feed valve per unit time is made to increase the higher an oxygen concentration in the exhaust gas.

9. An exhaust purification system of an internal combustion engine as claimed in claim 1, wherein an amount of hydrocarbons which is fed from the hydrogen feed valve per unit time is made to increase the greater an intake air amount.

10. An exhaust purification system of an internal combustion engine as claimed in claim 1, wherein when the exhaust purification catalyst should be raised in temperature or a particulate filter which is arranged inside of the engine exhaust passage should be raised in temperature, an amount of hydrocarbons which is fed from the hydrogen feed valve per unit time is made to increase.

11. An exhaust purification system of an internal combustion engine as claimed in claim 1, wherein when an action of feeding hydrocarbons which is performed to ensure a continued presence of the reducing intermediate on said basic exhaust gas flow surface part is started, an amount of hydrocarbons which is fed from the hydrogen feed valve per unit time is made to increase.

12. An exhaust purification system of an internal combustion engine as claimed in claim 1, wherein an action of feeding hydrocarbons which is performed to ensure a continued presence of the reducing intermediate on said basic exhaust gas flow surface part is started after activation of the oxidation catalyst.

13. An exhaust purification system of an internal combustion engine as claimed in claim 2, wherein said precious metal catalyst is used to react $NO_x$ contained in the exhaust gas and partially oxidized hydrocarbons so as to produce a reducing intermediate containing nitrogen and hydrocarbons, the produced reducing intermediate is held at said basic exhaust gas flow surface part, $NO_x$ is reduced by the reducing action of the reducing intermediate held on the basic exhaust gas flow surface part, and said predetermined feed intervals of hydrocarbons are feed intervals required for ensuring a continued presence of the reducing intermediate on the basic exhaust gas flow surface part.

* * * * *